US00RE39947E

(19) United States
(12) Reissued Patent
Johnson

(10) Patent Number: US RE39,947 E
(45) Date of Reissued Patent: Dec. 25, 2007

(54) TOY WATER GUN

(75) Inventor: Lonnie G. Johnson, Atlanta, GA (US)

(73) Assignee: Johnson Research & Development Co., Inc., Atlanta, GA (US)

(21) Appl. No.: 10/657,827

(22) Filed: Sep. 8, 2003

Related U.S. Patent Documents

Reissue of:
(64) Patent No.: 6,540,108
Issued: Apr. 1, 2003
Appl. No.: 08/402,624
Filed: Mar. 13, 1995

(51) Int. Cl.
*A63H 3/18* (2006.01)

(52) U.S. Cl. ..... 222/79; 222/207; 222/386.5; 222/401

(58) Field of Classification Search ..... 222/79, 222/207, 386.5, 401
See application file for complete search history.

(56) References Cited

U.S. PATENT DOCUMENTS

| | | | | |
|---|---|---|---|---|
| D78,206 | S | 4/1929 | Herman | |
| 2,049,194 | A | 7/1936 | Chapin et al. | 43/147 |
| 2,303,510 | A | 12/1942 | Swebilius | 42/69 |
| D159,040 | S | 6/1950 | Bicos | D30/1 |
| 2,589,977 | A | 3/1952 | Stelzer | 222/79 |
| D191,686 | S | 10/1961 | Johnson et al. | D62/2 |
| 3,005,495 | A | 10/1961 | Herberg | 169/31 |
| D200,473 | S | 3/1965 | Sawyer | D31/3 |
| 3,197,070 | A | 7/1965 | Pearl et al. | 222/79 |
| 3,273,553 | A | 9/1966 | Doyle | 124/3 |
| 3,578,789 | A | 5/1971 | Ferri | 222/79 |
| 4,160,513 | A | 7/1979 | Cockerman | 222/340 |
| 4,214,674 | A | 7/1980 | Jones et al. | 222/79 |
| D265,221 | S | 6/1982 | Hardin | D21/147 |
| 4,441,629 | A | 4/1984 | Mackal | 222/324 |
| 4,509,659 | A | 4/1985 | Cloutier et al. | 222/444 |
| 4,591,071 | A | 5/1986 | Johnson | 222/39 |
| D285,327 | S | 8/1986 | Yano | D21/147 |
| 4,630,757 | A | 12/1986 | Yano | 222/79 |
| 4,706,848 | A | 11/1987 | D'Aandrade | 222/79 |
| 4,735,239 | A | 4/1988 | Salmon et al. | 141/25 |
| 4,743,030 | A | 5/1988 | Auer et al. | 273/349 |
| 4,757,946 | A | 7/1988 | Johnson | 239/99 |
| D297,748 | S | 9/1988 | Marino | D21/147 |
| 4,854,480 | A | 8/1989 | Shindo | 222/79 |
| D303,820 | S | 10/1989 | Wong | D21/147 |
| 4,875,508 | A | 10/1989 | Burke, II et al. | 222/386.5 |
| 4,955,512 | A | 9/1990 | Sharphs | 222/387 |
| D318,309 | S | 7/1991 | D'Andrade | D21/147 |
| 5,029,732 | A | 7/1991 | Wong | 222/79 |
| 5,074,437 | A | 12/1991 | D'Andrade et al. | 222/79 |
| 5,150,819 | A | 9/1992 | Johnson et al. | 222/79 |
| 5,184,755 | A | 2/1993 | Brovelli | 222/79 |
| 5,184,756 | A | 2/1993 | Amron | 222/79 |
| D336,939 | S | 6/1993 | Salmon et al. | D21/147 |
| 5,229,531 | A | 7/1993 | Song | 42/58 |
| D338,697 | S | 8/1993 | Salmon et al. | D21/147 |
| 5,244,153 | A | 9/1993 | Kuhn et al. | 239/587.5 |
| D340,750 | S | 10/1993 | Salmon et al. | D21/147 |
| D341,174 | S | 11/1993 | Salmon et al. | D21/147 |
| D341,396 | S | 11/1993 | Salmon et al. | D21/147 |
| 5,366,108 | A | 11/1994 | Darlins | 222/79 |
| 6,540,108 | B1 | 4/2003 | Johnson | 222/79 |

FOREIGN PATENT DOCUMENTS

| | | | |
|---|---|---|---|
| GB | 28875 | of 1910 | 222/340 |
| GB | 431955 | 7/1935 | |
| GB | 669983 | 4/1952 | |

*Primary Examiner*—Philippe Derakshani
(74) *Attorney, Agent, or Firm*—Baker Donelson

(57) ABSTRACT

A water gun (10) is provided having a storage tank (18), a expandable pressure tank (19) having an elastic bladder (30) encased within an outer shell (29), and a pump (32) for conveying liquid from the storage tank to the expandable pressure tank. The conveyance of liquid into the expandable pressure tank causes the liquid to be pressurized by the biasing force of the elastic bladder. The pressurized liquid is released through a nozzle (21) coupled to the expandable pressure tank by actuation of a trigger (17).

42 Claims, 2 Drawing Sheets

TOY WATER GUN

Matter enclosed in heavy brackets [ ] appears in the original patent but forms no part of this reissue specification; matter printed in italics indicates the additions made by reissue.

TECHNICAL FIELD

This invention relates to toy water guns, and specifically to water guns having an expandable pressure tank.

BACKGROUND OF THE INVENTION

Water guns which eject a stream of water have been a very popular toy for children. These guns have been designed to eject the stream of water in a number of ways. The most common method of ejecting water has been by a manual pump coupled to the trigger of the gun. The pump is actuated by the mere pressure exerted by one finger of an operator upon the trigger, thus the pump typically cannot generate enough pressure to eject the water a lengthy distance. Additionally, these types of pumps work on the actuation of a compression piston which creates single, short bursts of water. However, many children desire the production of an extended stream of water.

Water guns have also been designed with small electric pumps which expel a stream of water from a tube coupled to the pump, as shown in U.S. Pat. Nos. 4,706,848 and 4,743,030. However, these small electric pumps typically cannot eject the stream of water a lengthy distance.

Toy water guns have also been developed which eject a stream of water by exerting pressure on the water within the gun greater than that of ambience and controlling the release of water through a control valve. The water is expelled from the gun due to this pressure difference. The pressurization of the water has been achieved in a variety of manners. U.S. Pat. No. 3,197,070 illustrates a water gun wherein pressure is applied to the water by collapsing a water storage area. Similarly, U.S. Pat. No. 4,854,480 illustrates a water gun wherein water is forced into an elastic bladder which expands to maintain the water under pressure.

Lastly, water guns have been designed with manual pumps which force water or air from a storage reservoir to a pressure reservoir, as shown in U.S. Pat. No. 5,150,819. The conveyance of the water or air into the pressure tank compresses the air therein, thereby exerting pressure on the water within the storage tank. However, as water is released from the pressure tank the volume occupied by the air increases. This increase in volume causes the air pressure within the pressure tank to decrease rapidly, thus resulting in a decrease in water pressure and a weaker projected water stream. Another potential problem associated with this type of water gun is that since the pressure tank is typically constructed of a hard plastic, the accidental striking of the pressure tank may cause it to crack or rupture. This problem is even more likely to occur when the interior of the plastic pressure tank is stressed under high pressure.

Accordingly, it is seen that a need remains for a water gun which can generate a long, steady stream of water and which is not easily ruptured. It is to the provision of such therefore that the present invention is primarily directed.

SUMMARY OF THE INVENTION

In a preferred form of the invention a water gun comprises a housing, a storage reservoir adapted to hold liquid and an expandable pressure tank adapted to hold liquid and to expand upon depositing liquid therein so as to exert a force upon the liquid. The water gun also has a pump for drawing liquid from the storage reservoir and depositing the drawn liquid into the expandable pressure tank. Conduit means are included for conveying liquid from the expandable pressure tank to ambience and control means for controlling the flow of liquid therethrough.

DETAILED DESCRIPTION

Figure 1:
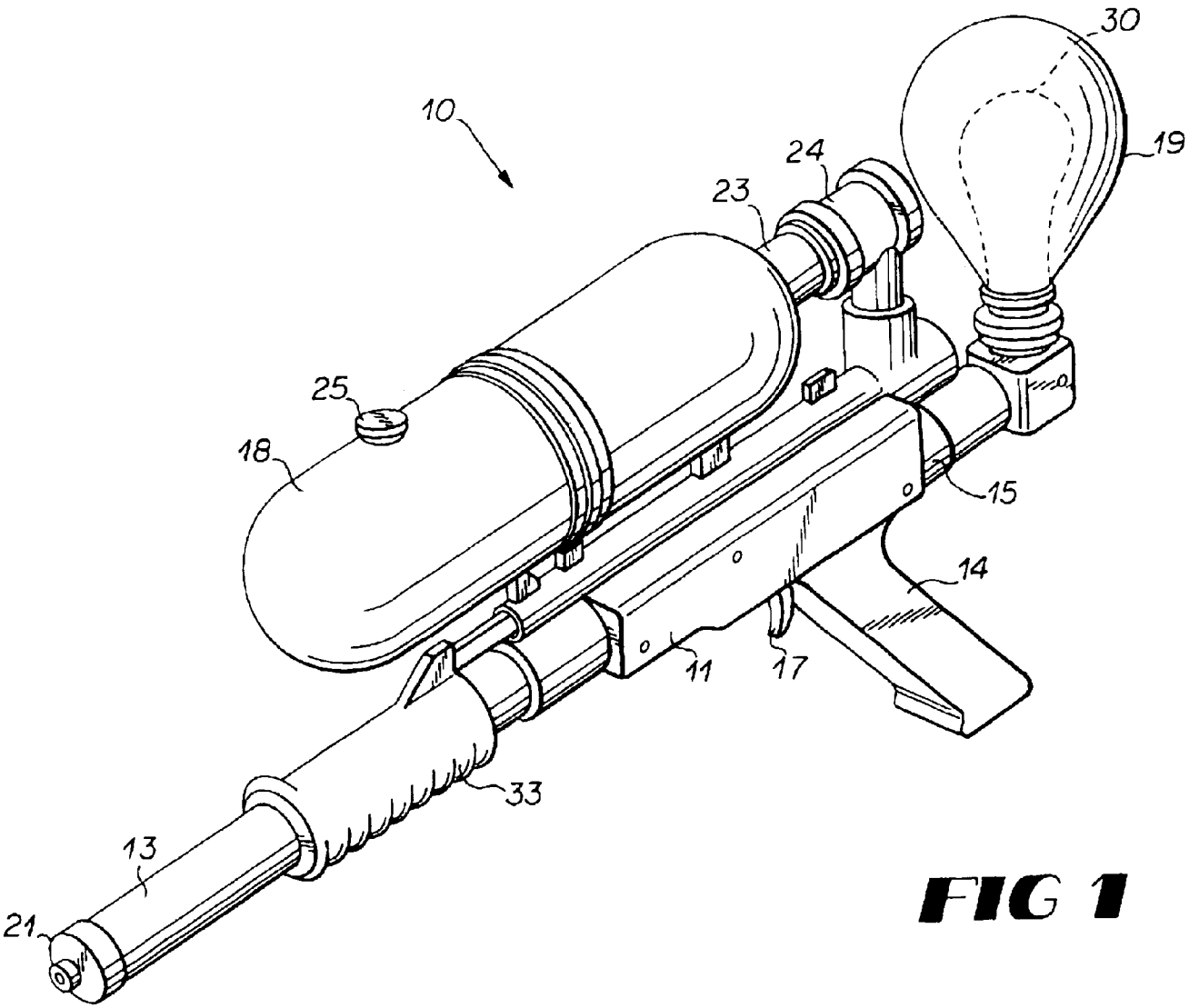
FIG. 1 is a perspective view of a water gun embodying principles of the invention is a preferred form.

With reference next to the drawings, there is shown a water gun 10 having a housing 11 in the shape of a gun with a barrel 13, a handle 14 and a stock 15. The gun 10 has a trigger 17, a removable liquid storage tank or reservoir 18 coupled to the stock 15, an expandable or resilient liquid pressure reservoir or tank 19 mounted to the stock, and a conventional nozzle 21 mounted to the end of the barrel 13. The storage tank 18 has a threaded neck 23 threadably mounted within a threaded receptor 24 within the housing and an opening or port 22 in which is removably mounted a filling cap 25. The receptor 24 has a spring biased check valve or vent 26 which allows air to enter storage tank 18. The pressure tank 19 has a plastic outer shell 29 and an elastic, expandable inner bladder 30 mounted within the outer shell 29 in fluid communication with the storage tank 18. The bladder is preferably made of an elastic material such a rubber. The bladder is shown in phantom lines in FIGS. 1 and 2 in an unpressurized, unexpanded, relaxed configuration and in FIG. 2 in a pressurized, expanded, tensioned configuration in solid lines.

Figures 2, 3:
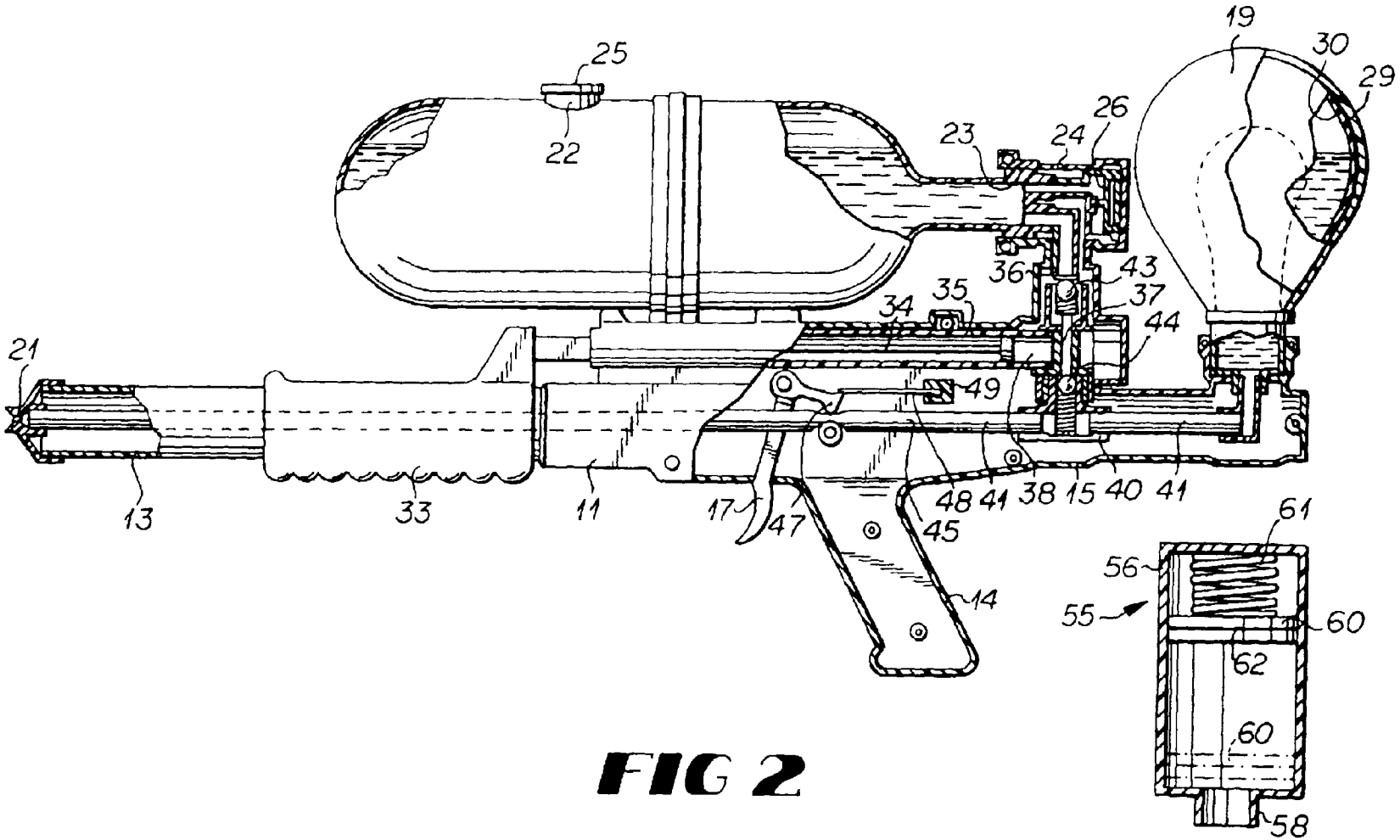
FIG. 2 is a side view, shown in partial cross-section, of the water gun of FIG. 1.
FIG. 3 is a cross-sectional view of an alternative embodiment of the expandable pressure tank of the water gun shown in FIG. 1.

As shown in FIG. 2, the gun 10 has a liquid pump 32 having a handle 33 slidably mounted to barrel 13. The handle 33 is coupled to a piston 34 slidably mounted within a cylinder 35. The cylinder 35 and piston 34 define a chamber 38. A flexible intake tube 36 extends from storage tank 18 to an inlet of pump 32. A flexible outlet tube 37 extends from an outlet of pump 32 to a T-shaped connection 40. A tube 41 extends from the T-shaped connection 40 to pressure tank 19. Intake tube 36 is coupled to a check valve 43 which restricts the flow of liquid to storage tank 18. Similarly, outlet tube 37 is coupled to a check valve 44 which restricts the flow of liquid to pump 32. A flexible delivery tube 45 extends from the T-shaped connection 40 to nozzle 21. A pivotable trigger pinch bar 47 is coupled to trigger 17 and a spring 48. The spring 48 biases pinch bar 47 against delivery tube 45. A stop 49 is positioned against delivery tube 45 opposite pinch bar 47.

In use, the liquid storage tank 18 is filled with a liquid, hereinafter referred specifically to as water W, either by removing it from the stock 15 and filling it through neck 23 or by removing filling cap 25 and pouring water into the tank through opening 22. Should the storage tank be removed for filling it is subsequently threadably remounted to the stock.

The pump handle 33 is then reciprocally moved so as to actuate piston 34 through cylinder 35. The movement of the piston 34 within the cylinder 35 has two-cycle strokes, a priming stroke where water is drawn forth from the storage tank 18, and a compression stroke wherein water is displaced by the piston 34. The priming stroke starts when the piston 34 is retreated within its cylinder 35 to create an elongated volume chamber 38. The vacuum created by the expanding chamber 38 draws water through the intake tube 36 and into chamber 38. The flow of water into the expanding chamber 38 opens check valve 43 that is normally biased in a closed position. Removal of water from the storage tank creates a vacuum within the storage tank which is equalized by air passing through check valve 26.

The compression stroke created by the advancement of the piston 34 within the cylinder 35 causes the water within the chamber 38 to become pressurized. The pressure of the water opens check valve 44 that leads to the elastic bladder 30 of pressure tank 19. As the piston is reciprocated within its cylinder, water is repeatedly drawn from the storage tank and deposited into the elastic bladder 30 through outlet tube 37 and tube 41. As more and more water is drawn and forced into the bladder 30 the bladder expands within outer shell 29 once the water therein exceeds a volume contained within the relaxed bladder. This may occur until the force used to drive the piston can no longer overcome the stored pressures, or the water pressure reaches a preselected pressure level which overcomes the biasing force exerted by pinch bar 47 so as to allow the water to be released through delivery tube 45. The expansion of the elastic bladder 30 creates a force upon the water therein, i.e. the expanded elastic bladder pressurizes the water therein. The pressurized water is prevented from escaping the pressure tank through outlet tube 37 by check valve 44. So long as the elastic bladder 30 is expanded it provides a force upon the water therein.

To release the pressurized water from the gun the trigger 17 is manually pulled to overcome the biasing force exerted by spring 48 upon pinch bar 47. Movement of pinch bar 47 from delivery tube 45 causes the pressurized water within tube 41, delivery tube 45 and pressure tank bladder 30 to be released as a stream from nozzle 21. The bladder contracts with expulsion of water therefrom but maintains a pressure upon the water until the bladder reaches a relaxed configuration. It should also be understood that the water gun may emit a stream of water while simultaneously pumping water through actuation of handle 33.

It should be understood that the outer shell 29 protects the elastic bladder 30 from direct contact which may cause its rupture. Also, the outer shell encases the bladder so as to provide an elastic limit so that the bladder is not overinflated or pressurized beyond its elastic limits. Nevertheless, it should also be understood that the outer shell is not mandatory.

With reference next to FIG. 3, an expandable, elastic pressure tank 55 in another preferred form is shown as an alternative to that shown in FIGS. 1 and 2. It should be understood that the remaining portions of the gun to which tank 55 is mounted are the same as previously described. Here, the pressure tank 55 has a housing 56 defining a chamber 57 and a neck 58 mounted to gun housing 11. The pressure tank 55 also has a plunger 60 movably mounted within chamber 57 and a spring 61 biasing the plunger 60 toward neck 58. The plunger 60 has a O-ring 62 which creates a seal between the plunger 60 and housing 56. The plunger 60 is shown in phantom lines in an unpressurized, expanded position and a pressurized, expanded position in solid lines. Thus, the term "expanded" is meant to describe the increase in fluid capacity within the pressure tank as the plunger is moved therein and not necessarily to the structure of housing 56, i.e. the casing. Similarly, the term "elastic" is meant to describe the changes in the size of chamber 57 as the plunger is moved within the housing.

In use, the pump 32 forces water into chamber 57 through neck 58. As more and more water is forced into chamber 57 the plunger 60 moves upward against the biasing force of the spring 61 from its unexpanded position to its expanded position. The compression force of the spring 61 upon the plunger maintains pressure upon the water within chamber 57 which enables the water to be expelled from the gun. As in the previous embodiment the orientation of the gun has no significant effect on its internal operation.

The expandable pressure tanks as just describe maintain a more constant pressure upon the water therein as compared to pressure tanks of the prior art utilizing compressed air. This is due to the fact that as water is removed from the pressure tank the volume of airspace increases while the quantity of air remains the same. This results in a rapid decrease in air pressure pressurizing the water within the tank.

It should be understood that an electrically motorized pump may be used in place of the manually actuated pump shown in the preferred embodiment.

It thus is seen that a toy water gun in now provided which maintains a more constant pressure upon liquid while being dispensed from the pressure tank. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A water gun comprising a housing; a storage reservoir adapted to hold liquid; an expandable pressure tank adapted to hold liquid and to expand under induced tension upon introducing liquid in excess of a selected volume therein and thereby exert a force upon the liquid; a pump for drawing liquid from said storage reservoir and depositing the drawn liquid into said expandable pressure tank; conduit means for conveying liquid from said expandable pressure tank to ambience; and control means for controlling the flow of liquid through said conduit means.

2. The water gun of claim 1 wherein said expandable pressure tank comprises an elastic bladder.

3. The water gun of claim 2 expandable pressure tank further comprises a protective shell encasing said elastic bladder.

4. The water gun of claim 1 wherein said expandable pressure tank has a chamber, a movable plunger mounted within said chamber, and spring biasing means for biasing said plunger in a directing to exert force upon liquid contained within said chamber.

5. The water gun of claim 1 further comprising limiting means for limiting pressure within said expandable pressure tank.

6. The water gun of claim 1 further comprising a check valve for preventing water within said expandable pressure tank from returning to said storage reservoir.

7. A water gun comprising a liquid storage reservoir;

an elastic pressure tank adapted to be expanded and contracted upon changes in the volume of liquid pumped therein;

a liquid pump;

first conduit means for conveying liquid contained within said storage reservoir to said pump;

second conduit means for conveying liquid from said pump to said elastic pressure tank;

third conduit means for conveying liquid from said elastic pressure tank to ambience; and control means for controlling the flow of liquid through said third conduit means, whereby liquid within the storage reservoir is pumped into the elastic pressure tank through the first and second conduits thereby forcing the elastic pressure tank to its second configuration so as to pressurize liquid therein which is controllably released from the elastic pressure tank through the third conduit means by actuation of the control means.

8. The water gun of claim 7 wherein said elastic pressure tank comprises an elastic bladder.

9. The water gun of claim 8 elastic pressure tank further comprises a protective shell encasing said elastic bladder.

10. The water gun of claim 7 wherein said elastic pressure tank has a chamber, a movable plunger mounted within said chamber, and spring biasing means for biasing said plunger in a directing to exert force upon liquid contained within said chamber.

11. The water gun of claim 7 further comprising a limiting means for limiting pressure within said elastic pressure tank.

12. The water gun of claim 7 further comprising a check valve for preventing water within said elastic pressure tank from returning to said storage reservoir.

13. A water gun comprising a housing, a storage reservoir; elastic pressure tank means for exerting pressure on a body of liquid therein of a magnitude relative to the volume of the body of liquid; means for drawing liquid from said storage reservoir and depositing the drawn liquid into said elastic pressure tank means; conduit means for conveying liquid from said elastic pressure tank means to ambience; and control means for controlling the flow of liquid through said conduit means.

14. The water gun of claim 13 wherein said elastic pressure tank means comprises an elastic bladder.

15. The water gun of claim 14 elastic pressure tank means further comprises a protective shell encasing said elastic bladder.

16. The water gun of claim 13 wherein said elastic pressure tank means has a chamber, a movable plunger mounted within said chamber, and spring biasing means for biasing said plunger in a directing to exert force upon liquid contained within said chamber.

17. The water gun of claim 13 further comprising a limiting means for limiting pressure within said elastic pressure tank means.

18. The water gun of claim 13 further comprising a check valve for preventing water within said elastic pressure tank means from returning to said storage reservoir.

*19. A water gun comprising a housing; a storage reservoir adapted to hold liquid; an expandable pressure tank adapted to hold liquid and to expand under induced tension upon introducing liquid in excess of a selected volume therein and thereby exert a force upon the liquid; a pump for drawing liquid from said storage reservoir and depositing the drawn liquid into said expandable pressure tank; conduit means for conveying liquid from said expandable pressure tank to ambience; and a trigger functionally coupled to said conduit means, whereby the actuation of the trigger causes water to be expelled through the conduit means.*

*20. The water gun of claim 19 wherein said expandable pressure tank comprises an elastic bladder.*

*21. The water gun of claim 20 expandable pressure tank further comprises a protective shell encasing said elastic bladder.*

*22. The water gun of claim 19 wherein said expandable pressure tank has a chamber, a movable plunger mounted within said chamber, and spring biasing means for biasing said plunger in a directing to exert force upon liquid contained within said chamber.*

*23. The water gun of claim 19 further comprising limiting means for limiting pressure within said expandable pressure tank.*

*24. The water gun of claim 19 further comprising a check valve for preventing water within said expandable pressure tank from returning to said storage reservoir.*

*25. A water gun comprising*

*a liquid storage reservoir;*

*an elastic pressure tank adapted to be expanded and contracted upon changes in the volume of liquid pumped therein;*

*a liquid pump;*

*first conduit means for conveying liquid contained within said storage reservoir to said pump;*

*second conduit means for conveying liquid from said pump to said elastic pressure tank;*

*third conduit means for conveying liquid from said elastic pressure tank to ambience; and*

*a trigger coupled to one said conduit means,*

*whereby liquid within the storage reservoir is pumped into the elastic pressure tank through the first and second conduits thereby forcing the elastic pressure tank to its second configuration so as to pressurize liquid therein which is controllably released from the elastic pressure tank through the third conduit means by actuation of the trigger.*

*26. The water gun of claim 25 wherein said elastic pressure tank comprises an elastic bladder.*

*27. The water gun of claim 26 elastic pressure tank further comprises a protective shell encasing said elastic bladder.*

*28. The water gun of claim 25 wherein said elastic pressure tank has a chamber, a movable plunger mounted within said chamber, and spring biasing means for biasing said plunger in a directing to exert force upon liquid contained within said chamber.*

*29. The water gun of claim 25 further comprising a limiting means for limiting pressure within said elastic pressure tank.*

*30. The water gun of claim 25 further comprising a check valve for preventing water within said elastic pressure tank from returning to said storage reservoir.*

*31. A water gun comprising a housing, a storage reservoir; elastic pressure tank for exerting pressure on a body of liquid therein of a magnitude relative to the volume of the body of liquid; a pump which draws liquid from said storage reservoir and depositing the drawn liquid into said elastic pressure tank; a conduit which conveys liquid from said elastic pressure tank to ambience; and a trigger, whereby the trigger controls the flow of liquid through the conduit.*

*32. The water gun of claim 31 wherein said elastic pressure tank comprises an elastic bladder.*

*33. The water gun of claim 32 elastic pressure tank further comprises a protective shell encasing said elastic bladder.*

*34. The water gun of claim 31 wherein said elastic pressure tank has a chamber, a movable plunger mounted within said chamber, and spring biasing means for biasing said plunger in a directing to exert force upon liquid contained within said chamber.*

*35. The water gun of claim 31 further comprising a limiting means for limiting pressure within said elastic pressure tank means.*

*36. The water gun of claim 31 further comprising a check valve for preventing water within said elastic pressure tank from returning to said storage reservoir.*

*37. A water gun comprising a housing, a storage reservoir; elastic pressure tank for exerting pressure on a body of liquid therein of a magnitude relative to the volume of the body of liquid; a pump which draws liquid from said storage reservoir and depositing the drawn liquid into said elastic pressure tank; a conduit which conveys liquid from said elastic pressure tank to ambience; and a controller functionally coupled to the conduit, whereby the controller controls the flow of liquid through the conduit.*

*38. The water gun of claim 37 wherein said elastic pressure tank comprises an elastic bladder.*

*39. The water gun of claim 38 elastic pressure tank further comprises a protective shell encasing said elastic bladder.*

*40. The water gun of claim 37 wherein said elastic pressure tank has a chamber, a movable plunger mounted within said chamber, and spring biasing means for biasing said plunger in a directing to exert force upon liquid contained within said chamber.*

*41. The water gun of claim 37 further comprising a limiting means for limiting pressure within said elastic pressure tank means.*

*42. The water gun of claim 37 further comprising a check valve for preventing water within said elastic pressure tank from returning to said storage reservoir.*

* * * * *

US00RE39947C1

(12) EX PARTE REEXAMINATION CERTIFICATE (8424th)

United States Patent
Johnson

(10) Number: US RE39,947 C1
(45) Certificate Issued: Jul. 26, 2011

(54) TOY WATER GUN

(75) Inventor: Lonnie G. Johnson, Atlanta, GA (US)

(73) Assignee: Johnson Research & Development Co., Inc., Smyrana, GA (US)

Reexamination Request:
No. 90/011,167, Aug. 20, 2010

Reexamination Certificate for:

| | |
|---|---|
| Patent No.: | **Re. 39,947** |
| Issued: | **Dec. 25, 2007** |
| Appl. No.: | **10/657,827** |
| Filed: | **Sep. 8, 2003** |

Related U.S. Patent Documents

Reissue of:

| | |
|---|---|
| (64) Patent No.: | **6,540,108** |
| Issued: | **Apr. 1, 2003** |
| Appl. No.: | **08/402,624** |
| Filed: | **Mar. 13, 1995** |

(51) Int. Cl.
*A63H 3/18* (2006.01)

(52) U.S. Cl. ..... 222/79; 222/207; 222/386.5; 222/401

(58) Field of Classification Search ..... None
See application file for complete search history.

(56) References Cited

U.S. PATENT DOCUMENTS

| | | | |
|---|---|---|---|
| 4,509,659 | A | 4/1985 | Cloutier |
| 5,150,819 | A | 9/1992 | Johnson |
| 5,366,108 | A | 11/1994 | Darling |

FOREIGN PATENT DOCUMENTS

| | | |
|---|---|---|
| JP | 07-063497 A | 3/1995 |
| WO | WO 94/00208 | 1/1994 |

*Primary Examiner*—Joseph A. Kaufman

(57) ABSTRACT

A water gun (10) is provided having a storage tank (18), a expandable pressure tank (19) having an elastic bladder (30) encased within an outer shell (29), and a pump (32) for conveying liquid from the storage tank to the expandable pressure tank. The conveyance of liquid into the expandable pressure tank causes the liquid to be pressurized by the biasing force of the elastic bladder. The pressurized liquid is released through a nozzle (21) coupled to the expandable pressure tank by actuation of a trigger (17).

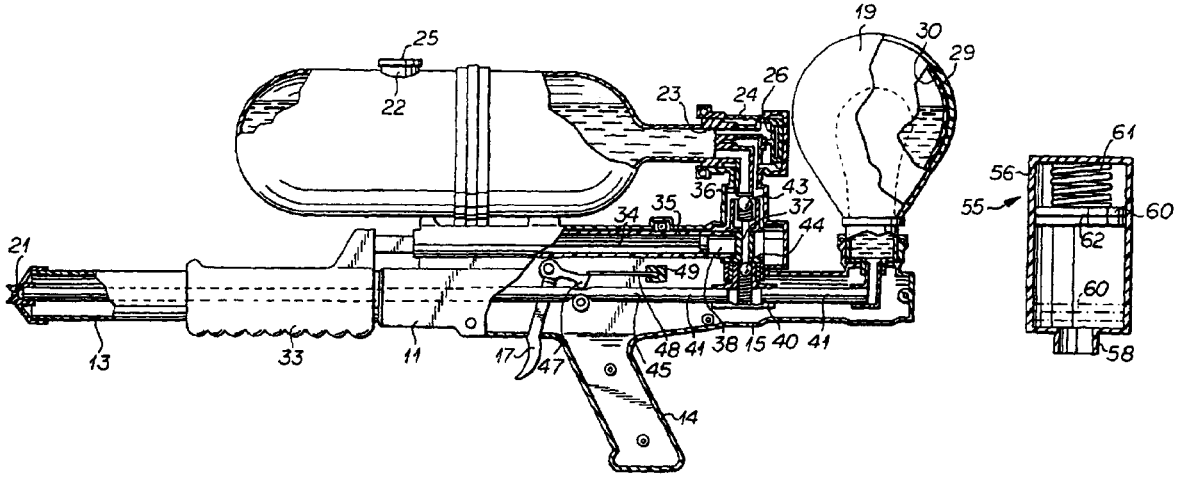

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-42 is confirmed.

* * * * *